United States Patent [19]

Mendiola et al.

[11] 4,390,052

[45] Jun. 28, 1983

[54] MOTORCYCLE TIRE

[75] Inventors: Joseph V. Mendiola, Ravenna; David E. Smith, Akron, both of Ohio

[73] Assignee: The Goodyear Tire & Rubber Company, Akron, Ohio

[21] Appl. No.: 255,010

[22] Filed: Apr. 17, 1981

[51] Int. Cl.³ .................. B60C 9/18; B60C 9/04
[52] U.S. Cl. ..................... 152/356 R; 152/353 G; 152/359; 152/361 R; 152/362 R
[58] Field of Search .......... 152/356 R, 353 G, 362 R, 152/354 R, 359, 355, 361 R, 361 DM, 374

[56] References Cited

U.S. PATENT DOCUMENTS 4,057,092 11/1977 Tracy .................. 152/362 R X
4,073,330 2/1978 Allard ................. 152/356 R X

FOREIGN PATENT DOCUMENTS 1222759 2/1971 United Kingdom ............. 152/356
1445873 8/1976 United Kingdom .

Primary Examiner—Edward C. Kimlin
Assistant Examiner—Thomas Bokan
Attorney, Agent, or Firm—L. R. Drayer

[57] ABSTRACT

A bias-belted motorcycle tire whose belt cord angle is at least two degrees less than the cord angle of the carcass plies. A sidewall stiffening structure extends from each bead and terminates in the respective sidewall a distance from the respective bead which is equal to between about 40 and about 60 percent of tire section height. A belt extends across the tread and terminates at a location which is spaced radially from the radially outermost point of the sidewall stiffening structure a distance equal to at least one-half inch to provide a flex zone.

This abstract is not to be taken as limiting the invention of this application, and in order to understand the full nature and extent of the technical disclosure of this application, reference must be made to the accompanying drawings and the following detailed description.

8 Claims, 2 Drawing Figures

MOTORCYCLE TIRE

BACKGROUND OF THE INVENTION

The present invention relates to tires, and more particularly, motorcycle tires.

Bias-belted tires have been used for years on automobiles and other four-wheeled vehicles. Such tires have been known to offer numerous advantages such as improved traction and tread life over the bias-ply automobile tire without belts.

Tires of the bias-ply type without belts have been used on motorcycles for years. The requirements for a motorcycle tire vary significantly from those for an automobile tire in that a motorcycle is a two-wheeled vehicle which, therefore, requires a greater amount of lateral stability. Bias-belted tires have previously not provided sufficient stability for use as motorcycle tires.

It is an object of this invention to provide a bias-belted tire which has sufficient stability for use as a motorcycle tire.

It is another object of this invention to provide a flex zone in each sidewall of a motorcycle tire so that stability may be maintained in the bead area while good ground contact for handling performance is provided. Other objects will be made apparent hereinafter.

To acquaint persons skilled in the arts most closely related to the present invention, certain preferred embodiments thereof illustrating a best mode not contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

DETAILED DESCRIPTION OF THE INVENTION

Figure 1:
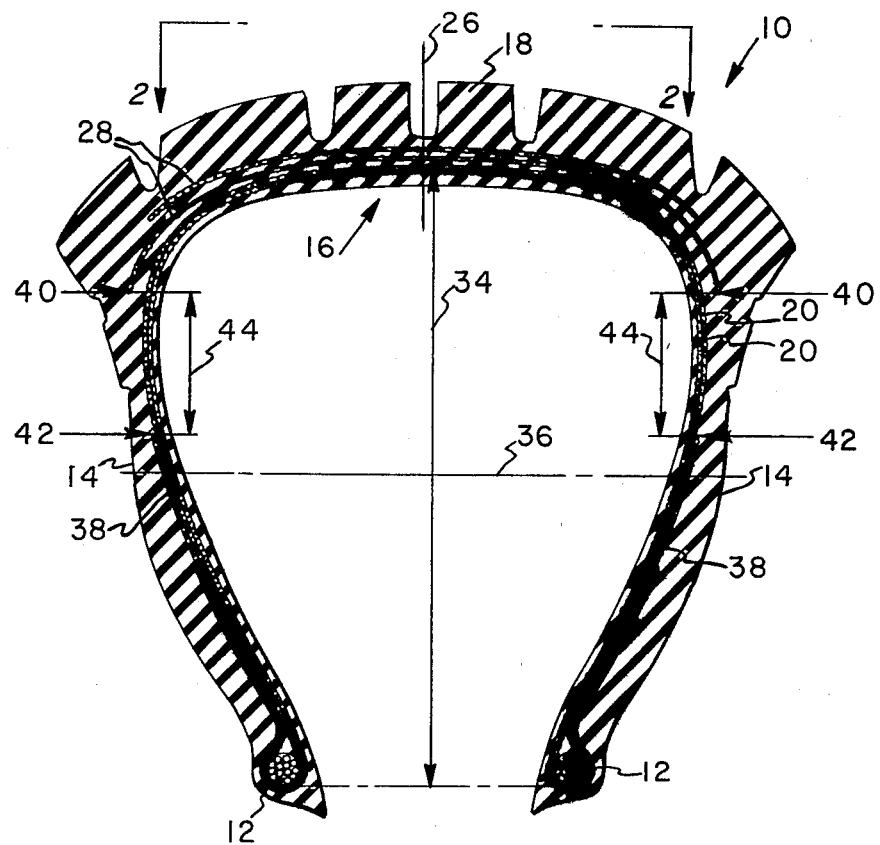
FIG. 1 is a cross-sectional view of a motorcycle tire embodying this invention.
Figure 2:
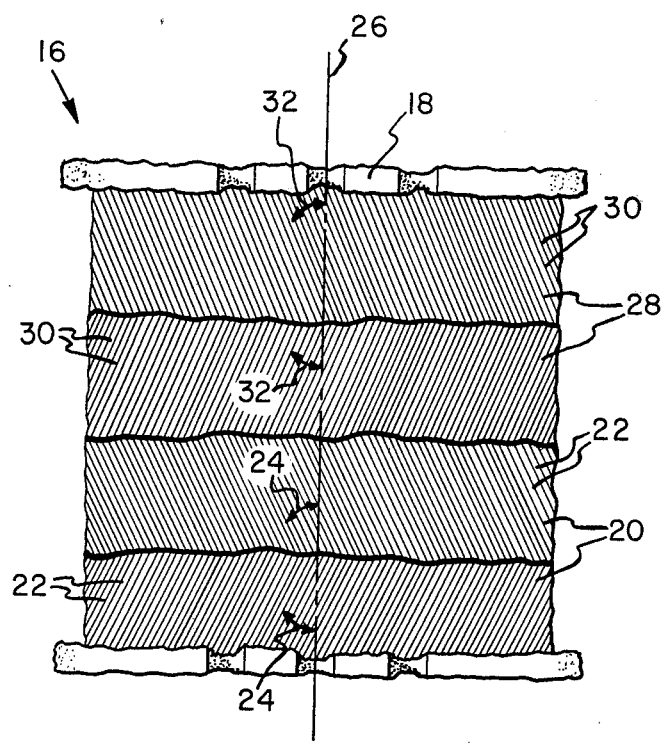
FIG. 2 is an enlarged partial view of the crown of the tire of FIG. 1 with portions broken away to show the plies and belts.

Referring to FIG. 1, there is shown a motorcycle tire 10 which is a toroidal-shaped composite structure which is provided with a pair of circular substantially inextensible beads 12 for mounting of the tire on a rim. A pair of sidewalls 14 extend from the beads 12 respectively to a crown portion 16 which extends circumferentially about the tire 10. A tread 18 for engaging the ground is provided on the outer periphery of the crown portion 16. A carcass of two or more plies 20 of elastomer-impregnated fabric extends between the beads 12 to provide reinforcement in the sidewalls 14 and crown portion 16 of the tire. These plies 20 are comprised of a plurality of generally parallel reinforcing cords 22 which extend at a cord angle, illustrated at 24 in FIG. 2, not greater than about 75 degrees, the cords of one ply extending at the same angle but in an opposed direction to the cords of the other ply such that the cords of one ply cross the cords of the other ply in a manner commonly known to those of ordinary skill in the art to which this invention pertains. By cord angle is meant that angle at which cords of a ply or belt extend relative to and at the mid-circumferential plane of a tire. The term "mid-circumferential plane" is defined for purposes of this specification and the claims as a plane which is perpendicular to the rotational axis of a tire and which lies midway between the tread edges. The mid-circumferential plane of tire 10 is shown at 26 in the drawings. The tread edges are the outermost points of a tire which touch the ground as the tire travels through its footprint while mounted on a vehicle under rated load and pressure. The carcass cords 22 may be made of any suitable material such as, by way of example only, nylon, rayon, polyester, fiberglass, aramid, or wire.

In accordance with a preferred embodiment of this invention, the cord angle 24 of the carcass cords 22 is not greater than about 30 degrees, and preferably is at least about 23 degrees such as between about 25 and about 28 degrees to provide, in conjunction with the belt cord angle described hereinafter, sufficient stability to the tire for use as a rear motorcycle tire. For example, a cord angle of about 26 or 27 degrees has been found to work satisfactorily.

Two or more belts 28 of reinforcing cords 30 impregnated with elastomeric material are provided in accordance with this invention between the tread 18 and the carcass plies 20 to provide a restricting force on the plies. The reinforcing cords 30 of the belts 28 extend at equal but opposed cord angles, illustrated at 32 in FIG. 2, so that the cords of one belt cross the cords of an adjacent belt in a manner commonly known to those of ordinary skill in the art to which this invention pertains.

Each of the belts 28 terminates at a location on each side of the tire which is radially outwardly of the mid-section height of the tire. The term "radially" refers to the direction perpendicular to the rotational axis of a tire. For the purpose of this specification and the claims, the "section height" of a tire is that distance between the radially innermost point of the beads and the radially outermost point of the outermost carcass ply. The section height of tire 10 is illustrated at 34 in FIG. 1 and the mid-section height is illustrated at 36. Although the belt cords 30 may be composed of any suitable tire cord material, it is preferable that they be composed of a high modulus material such as fiberglass or aramid. By "high modulus material" is meant a material having an initial modulus of elasticity of at least about 120 grams per denier.

In accordance with an aspect of this invention, the cord angle 32 of the belt-reinforcing cords 30 is at least two degrees less than the cord angle 24 of the carcass cores 22. In accordance with a preferred embodiment of this invention, the cord angle 32 of belt cords 30 is no more than four degrees less than the cord angle 24 of the carcass cords 22.

In order to maintain stability in the bead area while providing good ground contact for handling performance, it has been found to be desirable to provide a flex zone in each sidewall 14 in the radially outer portion thereof; that is, a zone which has less stiffness than the remaining tire portions so that controlled flexing may be provided at these zones as the tire 10 travels through the footprint. Therefore, in accordance with an aspect of this invention, a sidewall stiffening means 38 extends from each bead 12 and terminates in the respective sidewall 14 a distance from the respective bead 12 equal to between about 40 and about 60 percent of the section height 34 of the tire 10. At least one of the belts extends across the width of the tread 18 and terminates at a location, illustrated at 40 in FIG. 1, which is spaced in the radial direction from the radially outermost point 42 of the respective sidewall stiffening means 38 a distance, illustrated at 44 in FIG. 1, which is equal to at least about one-half inch to provide such a flex zone wherein the sidewalls are preferably as a result devoid of any reinforcement other than the reinforcement provided by the carcass cords.

By a belt extending "across the width of the tread" is meant that the belt extends over a width equal substantially to tread width so that the flex zones are provided in the radially outer portions of the sidewalls, respectively. The tread width is measured at the widest point of the tire footprint when the tire is mounted on a rim under rated load and pressure.

Preferably, the sidewall stiffening means 38 terminates at a distance from the respective bead 12 equal to between 45 percent and 57 percent of the section height 34 of the tire and the location 40 of termination of a belt 28 is spaced in a radial direction a distance 44 from the radially outermost point 42 of the respective sidewall stiffening means which is equal to not more than about one inch.

Although the sidewall stiffening means 38 may be any type of material which provides additional stiffness in the sidewalls 14, in accordance with a preferred embodiment of this invention, the sidewall stiffening means 38 is an extension of the carcass which is provided by folding at least one carcass ply 20 around the respective bead 12 and redirecting the carcass ply 20 in superposed relationship with itself as shown in FIG. 1.

A tire embodying this invention has been found to be especially useful as a rear motorcycle tire.

While certain representative embodiments and details have been shown for the purpose of illustrating the invention, it will be apparent to those skilled in the art that various changes and modifications may be made therein without departing from the spirit or scope of the invention.

What is claimed is:

1. A bias-belted motorcycle tire comprising: a pair of beads; a carcass extending between the beads, said carcass comprising two or more plies of reinforcing cords which extend at a cord angle, relative to and at the mid-circumferential plane of the tire, which is not greater than about 75 degrees, the cords of one ply extending at the same angle but in an opposed direction to the cords of the other ply; a tread disposed outwardly of the carcass, said tread having tread edges; a pair of sidewalls extending from the tread edges to the respective beads; two or more belts disposed between the tread and the carcass plies to provide a restricting force on the carcass plies, said belts comprising reinforcing cords which extend at a cord angle, relative to and at the mid-circumferential plane of the tire, which is at least 2 degrees less than the cord angle of the reinforcing cords of the plies of said carcass, the reinforcing cords of said belts extending at equal but opposed cord angles; and a sidewall stiffening means extending from each bead and terminating in the respective sidewall a distance from the respective bead equal to between about 40 and about 60 percent of the section height of the tire, and at least one of said belts extending across the width of said tread and terminating at a location which is spaced in the radial direction from the radially outermost portion of said sidewall stiffening means a distance which is equal to at least about one-half inch, but not more than about one inch, to provide a flex zone wherein the sidewalls are devoid of any reinforcement other than the reinforcement provided by the carcass.

2. A tire according to claim 1, wherein said cord angle of the carcass reinforcing cords, relative to and at the mid-circumferential plane of the tire, is not greater than about 30 degrees.

3. A tire according to claim 2, wherein said cord angle of the carcass reinforcing cords, relative to and at the mid-circumferential plane of the tire, is at least about 23 degrees.

4. A tire according to any one of claims 2 or 3, wherein said cord angle of the belt reinforcing cords is not more than 4 degrees less than said cord angle of the carcass reinforcing cords.

5. A tire according to any one of claims 1, 2, or 3, wherein said sidewall stiffening means terminates at a distance from the respective bead equal to between 45 percent and 57 percent of the section height of the tire.

6. A tire according to any one of claims 1, 2, or 3, wherein said sidewall stiffening means is an extension of the carcass provided by folding of at least one carcass layer around the respective bead and redirecting the carcass layer into superposed relationship with itself.

7. A tire according to any one of claims 1, 2 or 3, wherein the belt reinforcing cords are composed of material having an initial modulus of elasticity of at least about 120 grams per denier.

8. A bias-belted motorcycle tire comprising:
(a) a pair of beads;
(b) a carcass extending between the beads, said carcass comprising at least two plies of reinforcing cords which extend at a cord angle, relative to and at the mid-circumferential plane of said tire, which is at least about 23 degrees and not greater than about 30 degrees, the cords of on said layer extending at the same cord angle but in an opposed direction to the cords of the outer layer;
(c) a tread disposed outwardly of said carcass;
(d) a pair of sidewalls extending from the tread edges to the respective beads;
(e) a sidewall stiffening means extending from each bead and terminating in the respective sidewall a distance from the respective bead equal to between 45 and 57 percent of the section height of said tire, said sidewall stiffening means comprising an extension of the carcass provided by folding of at least one carcass layer around the respective bead and redirecting the carcass layer into superposed relationship with itself; and
(f) a pair of belts disposed between said tread and said carcass to provide a restricting force on the carcass plies, said belts comprising reinforcing cords which extend at a cord angle, relative to and at the mid-circumferential plane of the tire, which is at least 2 degrees and not more than 4 degrees less than said cord angle of the carcass-reinforcing cords, the cords of the belts extending at equal but opposed cord angles, and at least one of said belts extending across the width of said tread and terminating at a location which is spaced in the radial direction from the radially outermost portion of said respective sidewall stiffening means a distance which is equal to at least about one-half inch but not more than about one inch, to provide a flex zone wherein said sidwalls are devoid of any reinforcement other than the reinforcement provided by the carcass-reinforcing cords.

* * * * *

UNITED STATES PATENT AND TRADEMARK OFFICE
CERTIFICATE OF CORRECTION

PATENT NO. : 4,390,052
DATED : June 28, 1983
INVENTOR(S) : Joseph V. Mendiola and David E. Smith It is certified that error appears in the above-identified patent and that said Letters Patent are hereby corrected as shown below:

Column 4, line 35.  "On should be -- one -- .

Signed and Sealed this

Twentieth Day of September 1983

[SEAL]

Attest:

GERALD J. MOSSINGHOFF

Attesting Officer   Commissioner of Patents and Trademarks